United States Patent
Barbash

(10) Patent No.: US 11,995,833 B2
(45) Date of Patent: May 28, 2024

(54) SYSTEM AND METHOD FOR ON-PHASE MICROSCOPY

(71) Applicant: The Joan and Irwin Jacobs Technion-Cornell Institute, New York, NY (US)

(72) Inventor: Shahar Barbash, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 262 days.

(21) Appl. No.: 17/385,552

(22) Filed: Jul. 26, 2021

(65) Prior Publication Data

US 2022/0036556 A1   Feb. 3, 2022

Related U.S. Application Data

(60) Provisional application No. 63/059,310, filed on Jul. 31, 2020.

(51) Int. Cl.
*G06T 7/00* (2017.01)
*G06T 5/20* (2006.01)
*G06T 5/70* (2024.01)

(52) U.S. Cl.
CPC .............. *G06T 7/0016* (2013.01); *G06T 5/20* (2013.01); *G06T 5/70* (2024.01);
(Continued)

(58) Field of Classification Search
None
See application file for complete search history.

(56) References Cited

U.S. PATENT DOCUMENTS

| | | | | |
|---|---|---|---|---|
| 4,855,242 A | * | 8/1989 | Soeldner | G01N 33/564 436/811 |
| 5,210,018 A | * | 5/1993 | Nuzzolo | G01N 33/539 436/539 |

(Continued)

FOREIGN PATENT DOCUMENTS

| | | |
|---|---|---|
| CA | 2449628 C | 5/2008 |
| CN | 100413320 C | 8/2008 |

(Continued)

OTHER PUBLICATIONS

Pijuan et al. ("In vitro Cell Migration, Invasion, and Adhesion Assays: From Cell Imaging to Data Analysis", Frontiers in Cell and Developmental Biology I www.frontiersin.org, Jun. 2019 I vol. 7 I Article 107 (Year: 2019).*

(Continued)

*Primary Examiner* — Randolph I Chu
(74) *Attorney, Agent, or Firm* — M&B IP Analysts, LLC

(57) ABSTRACT

Techniques for processing images to be used for more accurate measurement of biological processes such as cell migration, as well as techniques for measuring cell migration. A method for processing microscopic images includes generating a smoothed image for a raw image by applying a smoothing filter to the raw image, wherein the raw image shows a plurality of cells and a background; generating a high pass filter image by dividing the raw image by the smoothed image; and transforming the high pass filter image into a transformed image by augmenting the spatial frequency of the plurality of cells shown in the high pass filter image with respect to the background.

22 Claims, 7 Drawing Sheets

(52) U.S. Cl.
CPC ............... *G06T 2207/10056* (2013.01); *G06T 2207/20036* (2013.01); *G06T 2207/30024* (2013.01); *G06T 2207/30242* (2013.01)

(56) References Cited

U.S. PATENT DOCUMENTS

| | | | |
|---|---|---|---|
| 5,514,707 A * | 5/1996 | Deckelbaum | A61K 31/365 514/455 |
| 5,854,223 A * | 12/1998 | Stein | A61K 47/54 536/24.5 |
| 6,982,171 B2 | 1/2006 | Kim et al. | |
| 2003/0232407 A1 * | 12/2003 | Zoller | A61P 27/00 506/13 |
| 2004/0091164 A1 * | 5/2004 | Sakatani | G06T 5/20 382/254 |
| 2005/0048045 A1 * | 3/2005 | Shetty | G01N 33/574 424/94.5 |
| 2006/0172280 A1 | 8/2006 | Kim et al. | |
| 2006/0257013 A1 * | 11/2006 | Ramm | G06T 7/0012 382/133 |
| 2008/0254480 A1 * | 10/2008 | Vujanovic | G01N 33/5014 435/7.1 |
| 2010/0080439 A1 | 4/2010 | Karam et al. | |
| 2011/0165681 A1 * | 7/2011 | Boyden | A61K 38/164 435/455 |
| 2011/0190679 A1 * | 8/2011 | Humes | A61M 1/3689 435/402 |
| 2011/0262423 A1 * | 10/2011 | Madec | C07K 14/495 424/94.63 |
| 2012/0070060 A1 | 3/2012 | Mahato | |
| 2013/0194410 A1 | 8/2013 | Topman et al. | |
| 2013/0287702 A1 | 10/2013 | Brady-Kalnay | |
| 2016/0060676 A1 | 3/2016 | Lei | |
| 2018/0038868 A1 * | 2/2018 | Gajewski | A61K 35/15 |
| 2019/0117977 A1 * | 4/2019 | Puleo | A61N 2/006 |
| 2019/0130161 A1 | 5/2019 | Chang et al. | |
| 2020/0019748 A1 | 1/2020 | Saruwatari et al. | |
| 2020/0090335 A1 | 3/2020 | Wiles et al. | |
| 2020/0225238 A1 * | 7/2020 | Jeon | G01N 21/6428 |
| 2021/0241855 A1 * | 8/2021 | Travis | G16B 5/20 |
| 2022/0064697 A1 * | 3/2022 | Zhuang | C12Q 1/6841 |
| 2022/0220565 A1 * | 7/2022 | Deckert | A61K 45/06 |
| 2022/0339127 A1 * | 10/2022 | Bharti | A61K 31/451 |
| 2023/0070181 A1 * | 3/2023 | Mulligan | C12N 15/1135 |

FOREIGN PATENT DOCUMENTS

| | | |
|---|---|---|
| JP | 4558047 B2 | 10/2010 |
| JP | 4575403 B2 | 11/2010 |
| JP | 5161052 B2 | 3/2013 |
| KR | 101220002 B1 | 1/2013 |

OTHER PUBLICATIONS

Li et al. "Cellcounter: Novel Open-Source Software for Counting Cell Migration and Invasion In Vitro", Hindawi Publishing Corporation BioMed Research International vol. 2014, Article ID 863564, 6 pages (Year: 2014).*

Justus et al. "In vitro Cell Migration and Invasion Assays", Journal of Visualized Experiments, Jun. 1, 2014 (Year: 2014).*

Joe Clayton, Peter Brescia, and Peter Banks Agilent Technologies, Inc. "Automated Label-Free Method for Measuring Cell Migration in Real-Time with Oris Pro Assay". https://www.biotek.com/resources/application-notes/automated-label-free-method-for-measuring-cell-migration-in-real-time-with-oris-pro-assay/#:~:text=%20Automated%20Label-Free%20Method%20for%20Measuring%20Cell%20Migration,3%20Materials%20and%20Methods.%20HT-1080%20fibrosarcom . . . %20More%20. May 21, 2019.

Platypus Techologies. "Cell Migration Assay: Oris™: a Simple Platform for Publication-Ready Data". https://www.platypustech.com/cell-based-assays/oris-cell-migration. Accessed Jul. 26, 2021.

Sartorius. "Empower your research with IncuCyte® Live-Cell Analysis Systems". https://www.sartorius.com/en/products/cell-analysis/incucyte-live-cell-analysis-system. Accessed Jul. 26, 2021.

Sartorius. "IncuCyte® Cell Migration Kit from Sartorius". https://www.news-medical.net/IncuCyte-Cell-Migration-Kit-from-Sartorius. Accessed Jul. 26, 2021.

International Search Report and Written Opinion of International Searching Authority for PCT/IB2021/056776, ISA/IL, Jerusalem, Israel, Dated: Oct. 26, 2021.

* cited by examiner

SYSTEM AND METHOD FOR ON-PHASE MICROSCOPY

CROSS-REFERENCE TO RELATED APPLICATIONS

This application claims the benefit of U.S. Provisional Application No. 63/059,310 filed on Jul. 31, 2020, the contents of which are hereby incorporated by reference.

TECHNICAL FIELD

The present disclosure relates generally to microscopy, and more specifically to processing images for use in detecting and counting cell migration in microscopic images.

BACKGROUND

Migration of cells is an important biological process involved in several human diseases such as cancer, Alzheimer's disease, inflammation, and the like. Typically, in experiments to determine cell migration, cells are plated in one side of a double-sided, transparent plate that has pores throughout. Over time, migration of cells through the pores from one side of the plate to the other is driven by chemicals added to the side of the plate to which cells will migrate. Both sides of the plate are imaged separately over the course of hours or days. Accurately measure cell migration during such experiments is important to achieve research goals.

Some existing solutions enable automation of the process of measuring cell migration. These solutions may utilize images captured during experiments and computer software configured to measure cell migration based on the images. Such existing software faces challenges in accurately identifying cells in phase and, therefore, in accurately measuring cell migration. New automated solutions which more accurately measure cell migration are desirable.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

SUMMARY

Figure 1:
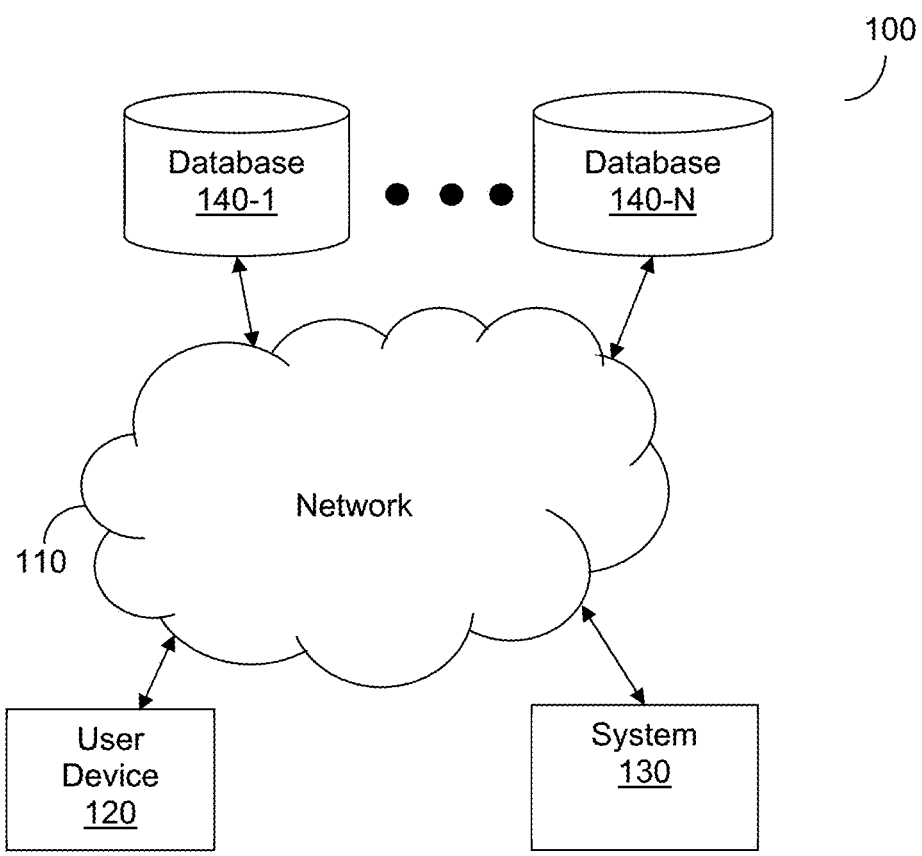
FIG. 1 is a network diagram utilized to describe various disclosed embodiments.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include for processing microscopic images. The method comprises: generating a smoothed image for a raw image by applying a smoothing filter to the raw image, wherein the raw image shows a plurality of cells and a background; generating a high pass filter image by dividing the raw image by the smoothed image; and transforming the high pass filter image into a transformed image by augmenting the spatial frequency of the plurality of cells shown in the high pass filter image with respect to the background.

Certain embodiments disclosed herein also include a non-transitory computer readable medium having stored thereon causing a processing circuitry to execute a process, the process comprising: generating a smoothed image for a raw image by applying a smoothing filter to the raw image, wherein the raw image shows a plurality of cells and a background; generating a high pass filter image by dividing the raw image by the smoothed image; and transforming the high pass filter image into a transformed image by augmenting the spatial frequency of the plurality of cells shown in the high pass filter image with respect to the background.

Certain embodiments disclosed herein also include a system for processing microscopic images. The system comprises: a processing circuitry; and a memory, the memory containing instructions that, when executed by the processing circuitry, configure the system to: generate a smoothed image for a raw image by applying a smoothing filter to the raw image, wherein the raw image shows a plurality of cells and a background; generate a high pass filter image by dividing the raw image by the smoothed image; and transform the high pass filter image into a transformed image by augmenting the spatial frequency of the plurality of cells shown in the high pass filter image with respect to the background.

Certain embodiments disclosed herein include for processing microscopic images. The method comprises: selecting a sensitivity by iteratively applying a threshold to an image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and generating a processed image using the selected sensitivity.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for on-phase microscopy. The disclosed embodiments include techniques for processing images to be used for microscopy measurements and techniques for using such processed images to measure progress of cells in processes such as cell migration or cell cycling.

In an embodiment for measuring cell migration, microscopic images showing cells at various stages of cell migration are received. The images show cells at either side of a plate and are associated with respective times such that the images collectively show progress of a process involving cell movement over time. The images are processed in order to increase the accuracy of detecting cells in the images. A number of cells on each side of the plate is determined, and the numbers of cells on the sides of the plate are compared to identify a cell migration effect. Alternatively, the images may show the cell cycle and be utilized to measure the cell cycle effect.

In an embodiment, the images are processed in a method including selecting a suitable sensitivity for cell detection and applying filters to remove objects that may be inaccurately detected as cells. Raw images are smoothed using a smoothing filter. The smoothed images are converted into a high pass filter image by augmenting the spatial frequency of the images. The high pass filter images are transformed based on a selected sensitivity. Selecting the sensitivity involves iteratively testing different sensitivity values until a sensitivity value results in a sum of cells that remains steady over time across the images. Cell morphology parameters may be determined using the transformed images.

In a further embodiment, selecting the sensitivity begins by initializing the sensitivity to a default value and applying a threshold to each image based on the initial sensitivity value. Small objects and false positive objects are filtered from each image. Cells are detected in each image. It is checked whether the total number of cells in each image remains steady over time. If so, the current sensitivity is selected and cell detection proceeds. Otherwise, the sensitivity is iteratively modified until the resulting images cause cell detection to remain steady over time.

The disclosed embodiments allow for automated measurement of cell progress in processes such as cell migration that provide more accurate measurements than other automated solutions. In particular, the disclosed embodiments reduce the rate of false positives in identifying cells, thereby increasing accuracy of measurements based on numbers of identified cells.

FIG. 1 shows an example network diagram 100 utilized to describe the various disclosed embodiments. In the example network diagram 100, a user device 120, a measurement system 130, and a plurality of databases 140-1 through 140-N (hereinafter referred to individually as a database 140 and collectively as databases 140, merely for simplicity purposes) are communicatively connected via a network 110. The network 110 may be, but is not limited to, a wireless, cellular or wired network, a local area network (LAN), a wide area network (WAN), a metro area network (MAN), the Internet, the worldwide web (WWvV), similar networks, and any combination thereof.

The user device (UD) 120 may be, but is not limited to, a personal computer, a laptop, a tablet computer, a smartphone, a wearable computing device, or any other device capable of receiving and displaying notifications, images, and the like.

The databases 140 store microscopic images to be processed and utilized by the measuring system 130 in accordance with the disclosed embodiments. The microscopic images are images showing cells on either side of a plate during a process requiring measurement such as cell migration. The databases 140 may further store results of measurements, processed images, or both.

The measuring system 130 is configured to process the microscopic images and to measure, based on the processed images, progress on cell processes such as cell migration. The measuring system 130 is configured to send the results of measurements to the user device 120, and may further be configured to send the processed images for display.

Figure 2:
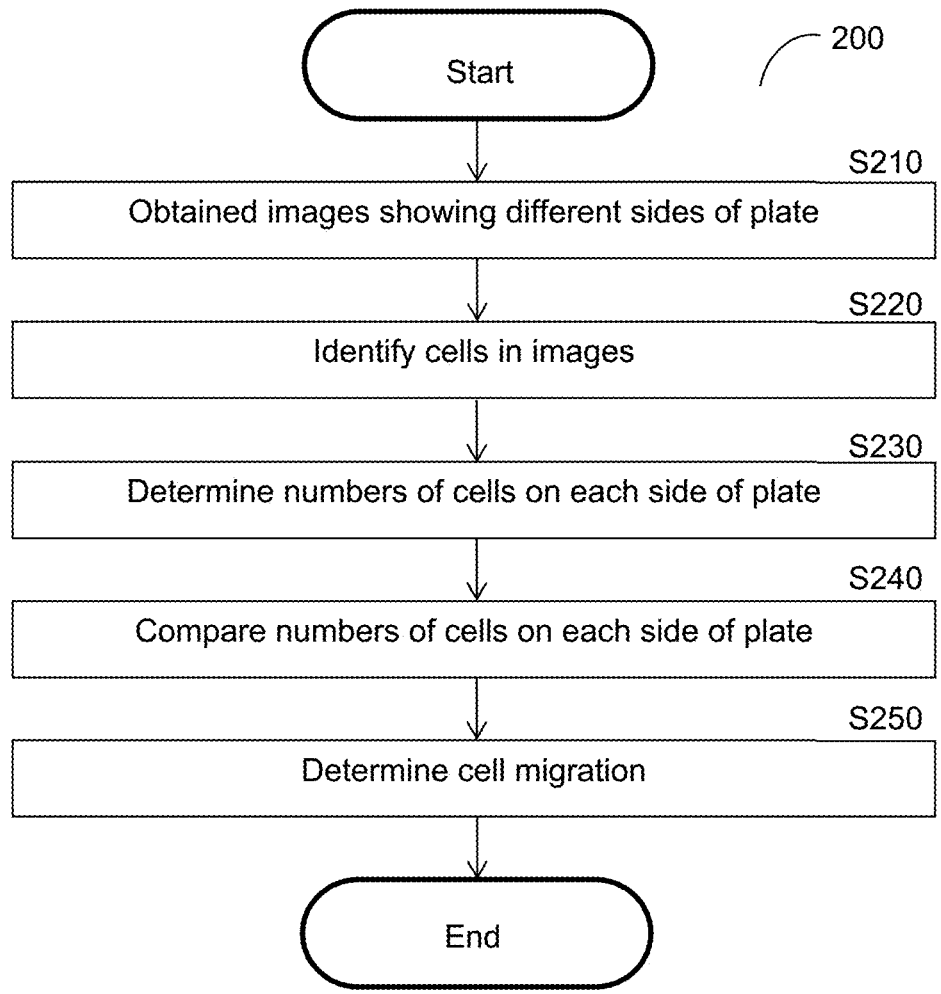
FIG. 2 is a flowchart illustrating a method for measuring cell migration according to an embodiment.

FIG. 2 is a flowchart illustrating a method 200 for measuring cell migration according to an embodiment. In an embodiment, the method is performed by the measuring system 130, FIG. 1.

At S210, images are obtained. The images may be received or retrieved from, for example, a microscopic image database (e.g., one of the databases 140).

The images show cells positioned on a plate that are subject to some experimental observation. The images are captured at respective times (for example, as indicated in timestamps of the images) such that the images collectively show progress of a cell movement process over time.

In an example implementation, the images show cells positioned on one of two sides of a plate used to measure cell migration. In such a cell migration experiment, cells pass from one side of the plate to another such that each cell is positioned on one of two sides of the plate. The movement of cells from one side of the plate to the other is relevant for determining the rate of cell migration, which can in turn be used to identify the presence or absence of various diseases related to abnormal cell migration. In other implementations, the images may be images used for measuring the cell cycle effect or other processes which do not involve proliferation of cells.

At S220, cells are identified in the images. In an embodiment, S220 includes processing each obtained image and selecting an appropriate sensitivity for detecting cells in the image in order to improve the accuracy of the cell identification. The processes involved in S220 are described further below with respect to FIGS. 3 and 4.

At S230, a number of cells on each side of the plate at each of multiple times is determined based on the identification of cells within the images.

At S240, the numbers of cells on the different sides of the plate at each time are compared.

At S250, based on the comparison, values representing the degree of cell migration at different times are determined. In an embodiment, each value is determined based on the comparison of the number of cells on each side of the plate at the respective time. More specifically, in an example implementation, the value is a proportion representing a number of cells that have migrated over the total number of cells on both sides of the plate. In a further example implementation, the cells may be compared at periodic time intervals, e.g., every 1 minute.

In this regard, it is noted that during a cell migration experiment, an initial number of cells X is placed on one side of a plate. During migration, cells migrate from that side of the plate to the other side of the plate over time. For example, at an initial time to, the number of cells on the first side of the plate may be 500. At a time $t_1$, the number of cells on the first side of the plate may be 400 and a number of cells that have migrated to the second side of the plate is 100. In an example implementation, the value is a proportion of the number of cells on the second plate to the total number of cells X such that the value at to is 0 (i.e., representing that 0% of the X cells have migrated) and that the value at $t_1$ is 0.2 (i.e., representing that 20% of the X cells have migrated). Thus, a non-limiting example series of values may be (0, 0.2, 0.5, 0.8, 0.9), with these values collectively showing the rate of migration at different stages in the migration process.

Figure 3:
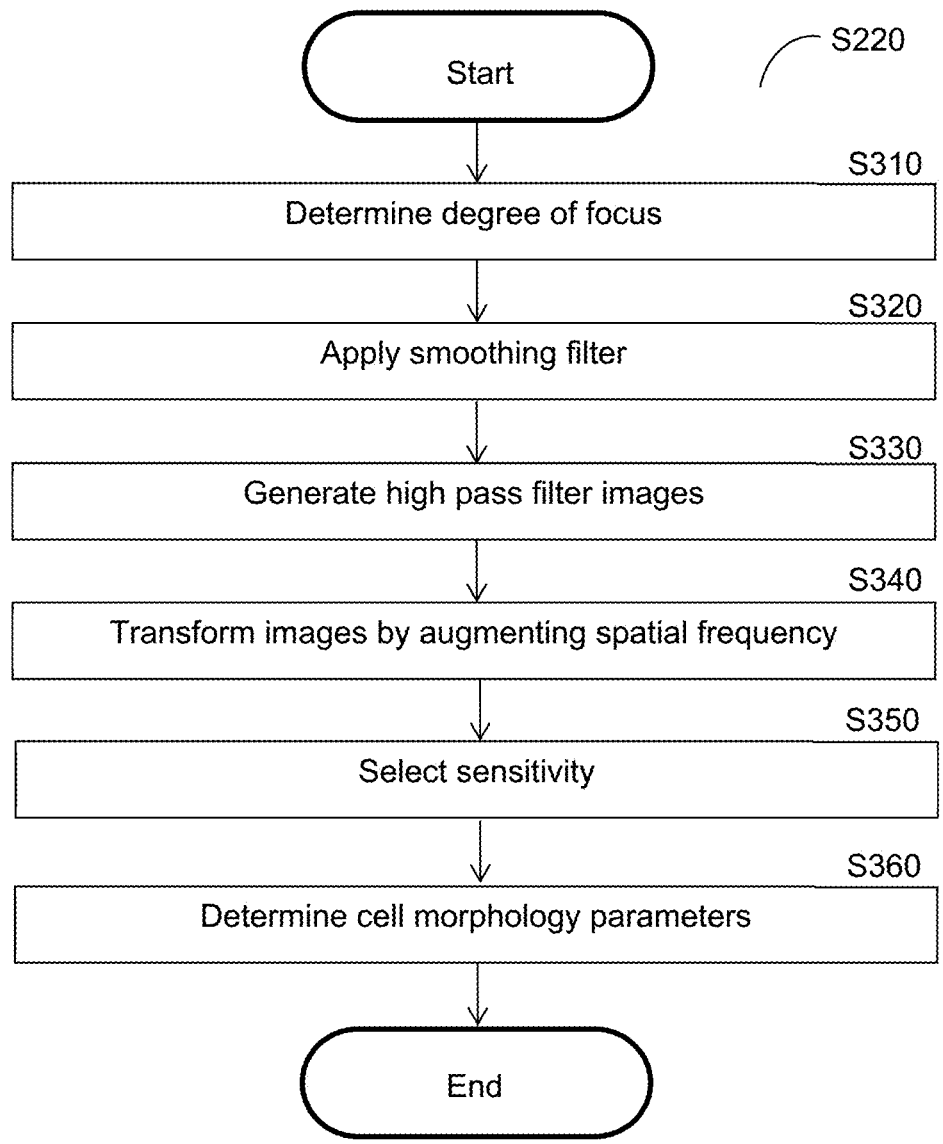
FIG. 3 is a flowchart illustrating a method for processing images for use in measuring biological processes according to an embodiment.

FIG. 3 is a flowchart illustrating a method S220 for processing images for use in measuring biological processes according to an embodiment. The method is performed based on raw images showing cells at various stages of movement.

At S310, a degree of focus of each raw image is determined. In an embodiment, S310 includes determining a relative degree of focus using a probabilistic method such as Absolute Central Moment. Determining the degree of focus allows for accounting for focus drift during the experiment shown in the images.

At S320, a smoothing filter is applied to each raw image in order to result in smoothed images. In an example implementation, the smoothing filter is a Savitzky-Golay filter. Use of such a filter allows for increasing the precision of the cell detection without distorting the signal tendency via, for example, a convolution procedure.

In an embodiment, S320 further includes normalizing the smoothed images based on a maximum value in the smoothed image.

At S330, high pass filter images are generated based on the raw images and their respective normalized smoothed images. In an embodiment, S330 includes dividing each raw image by the respective normalized smoothed image obtained at S320 such that the result of the division is the high pass filter image.

At S340, the high pass filter images are transformed into transformed images by augmenting the spatial frequency of cells shown therein. The transformation is utilized to create transformed images which mirrors the negative signal around the background of the images, thereby strengthening the high spatial frequency of cells shown in the images compared to the background.

In an embodiment, S340 includes normalizing each high pass filter image by its median to obtain a first result, multiplying the first result by a scalar C to obtain a second result, subtracting the scalar C from the second result to obtain a third result, and taking the absolute value of the third result to obtain the transformed image. The scalar C corresponds to the averaged value of the high pass filter image in the background. In an example implementation, the averaged value is a factor of 200. The transformation performed at S340 is summarized as follows:

$$I_T = \left| \left[ \frac{I_{HPF}}{\text{median}(I_{HPF})} \times C \right] - C \right| \quad \text{Equation 1}$$

In Equation 1, $I_T$ is the transformed image, $I_{HPF}$ is the high pass filter image, and C is the scalar value.

In a further embodiment, S340 further includes filtering the transformed images. In an example implementation, the filtering of S340 is median filtering.

At S350, processed images are generated using an appropriate sensitivity. In an embodiment, S350 includes selecting the appropriate sensitivity for the images. Selecting the sensitivity includes adjusting the sensitivity until one or more sensitivity requirements are met. In particular, the sensitivity requirements may require that the sum of cells detected on both sides of a plate remain steady over time as demonstrated by the images. In an embodiment, the sensitivity is selected as described with respect to FIG. 4.

The resulting processed image has an appropriate sensitivity that allows for optimally accurate detection of cells therein.

Figure 6:
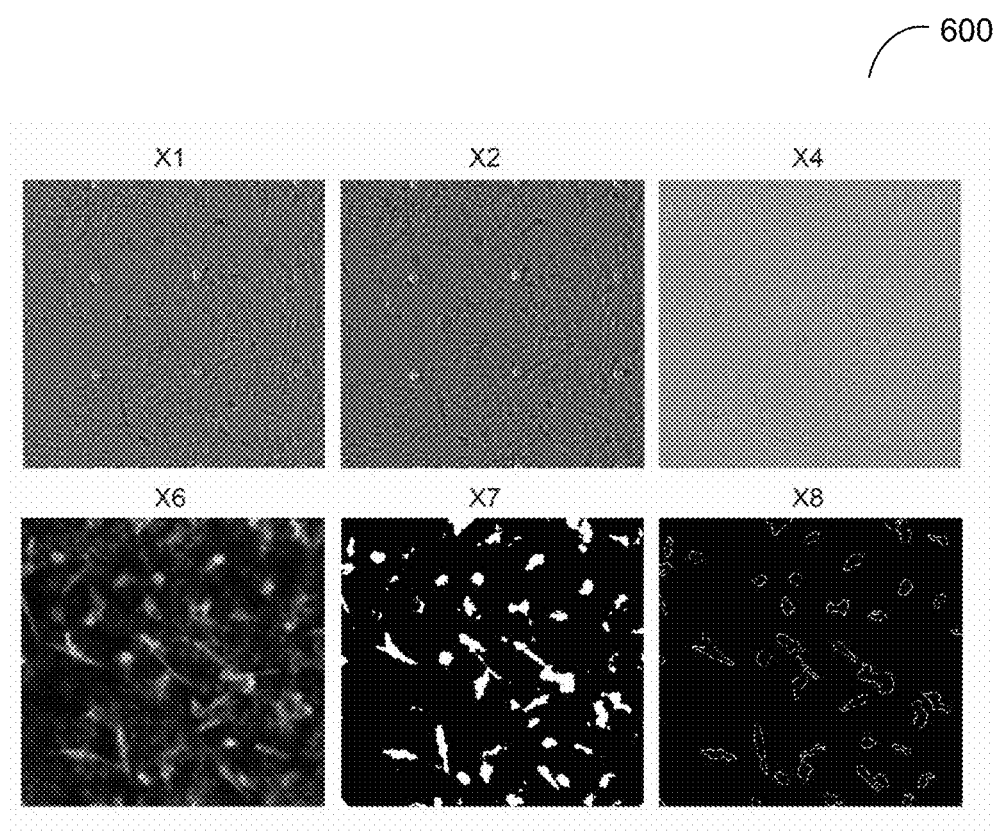
FIG. 6 illustrates images at various stages of processing according to the disclosed embodiments.

FIG. 6 illustrates images 600 showing various stages of image processing according to the disclosed embodiments. The images 600 include images labeled X1, X2, X4, X6, X7, and X8, which will now be described with respect to the steps S310 through S340. The image X1 is the raw image. The image X2 is the smoothed image generated at S320. The image X4 is the high pass filter image generated at S330. The image X6 is the transformed image with a median filter applied. The image X7 is an intermediate result of the processing performed at S350 which involves applying a threshold based on the sensitivity which is ultimately selected. The image X8 is a processed image generated as described with respect to S350 and FIG. 4.

Returning to FIG. 3, at optional S360, one or more morphological measures are determined based on cells detected in the processed images. The morphological measures may include, but are not limited to, circularity, ratio between minor and major axes, area to convex area ratio, and area. The morphological measures may be determined based on each image to allow for tracking of the measures over time. In an example implementation, S360 includes utilizing image recognition to identify outer bounds of a group of cells, and geometrical parameters such as radius, axes lengths, perimeter, and the like, may be calculated using known sizes of objects in the images (e.g., a known average size of each cell as measured using area, radius, etc.).

The morphological measures may be utilized to determine other facets relevant to biological processes. As a non-limiting example, the morphological measures may be utilized to determine how many migrated cells have become flat and therefore have already settled on the plate. This, in turn, may be utilized to determine cell states of these cells. The processing of images described above allows for more accurate determination of these morphological parameters.

The circularity measure may be computed as $$\frac{4\pi A}{P^2},$$

where A is the Area of the cells and P is the perimeter of the cells. A perfect circle would have a circularity measure of 1, and the circularity measurement decreases the farther away from a circle.

The ratio between distance of minor and major axes is a ratio of distances of each axis. The major axis is the axis including the most stretched-out component of the shape formed by the cells, while the minor axis is the axis orthogonal to the major axis. The value of this ratio is between 0 and 1.

The area to convex area ratio measures the area of a shape formed by the cells relative to the convex shape surrounding the shape formed by the cells. The value of this ratio is between 0 and 1.

The area is the area of the shape.

The morphological measures may be utilized to collectively illustrate different facets of processes such as cell migration. In this regard, it has been identified that the above measures have biological relevance for some processes.

Figure 4:
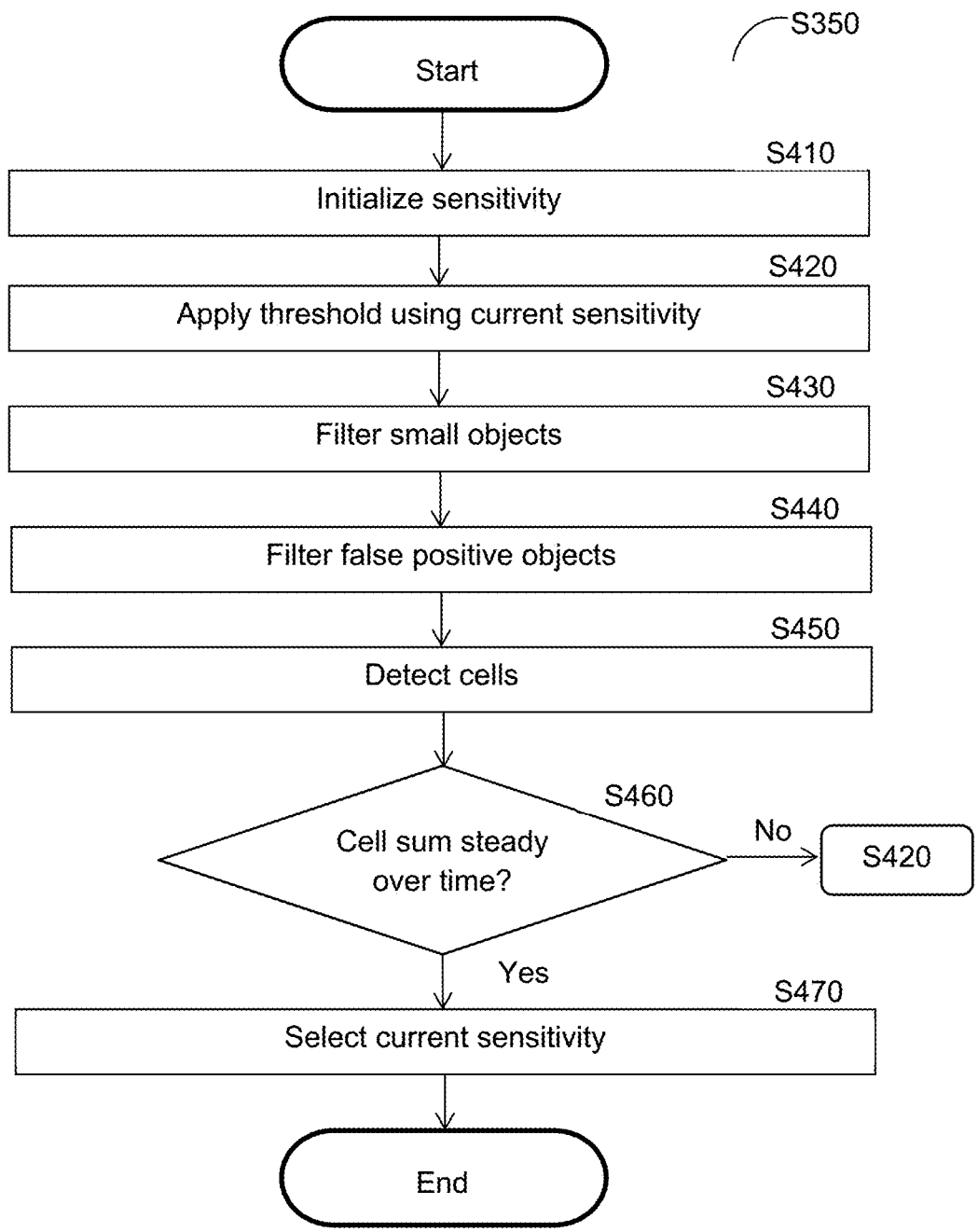
FIG. 4 is a flowchart illustrating a method for selecting sensitivity of cell detection according to an embodiment.

FIG. 4 is a flowchart illustrating a method S350 for selecting sensitivity of cell detection according to an embodiment.

At S410, a sensitivity for detecting cells is initialized. In an example implementation, the sensitivity is initialized to a default value of 0.7.

At S420, a threshold is applied to each image using the current sensitivity. In an embodiment, the threshold is computed as the product of Sensitivity and Focus. The value of Focus is equal to a degree of focus for each image (e.g., the degree of focus determined at S310, FIG. 3).

At S430, small objects are filtered from each image. Each small object is an object having a size below a threshold. In an example implementation, the threshold is 200 pmt. The threshold may be, for example, a threshold set by a user during an experiment or a predetermined threshold. In an embodiment, S430 further includes obtaining the edge of each binary object.

At S440, false positive objects are filtered from each image. More specifically, false positive objects are filtered from a portion of each image showing one side of the plate based on the objects on the other side of the plate.

In an embodiment, a jitter is calculated for each side of the plate. The jitter around cell objects for each side of the plate is calculated as the sum of the absolute value of a difference in pixels intensity. The jitter of one side of the plate is compared to the jitter of the other side of the plate. If the jitter of the first side of the plate is less than the jitter of the second side of the plate, than objects on the first side object are determined to be false positives and filtered out. In this regard, it has been identified that a relatively low jitter on the first side of the plate tends to be indicative that an object is a shadow of a cell on the other side of the plate and, therefore, would be falsely detected as a cell. Thus, removing false positive objects based on jitter improves the accuracy of the cell detection.

At S450, it is determined whether a sum of cells in the images is steady and, if so, execution continues with S460 where the current sensitivity is selected for use. Otherwise, the sensitivity is modified, and execution continues with S420 using the newly modified sensitivity. It should be noted that, in various implementations, this steadiness check may be made repeatedly throughout the process in order to continuously reevaluate steadiness and adjust accordingly.

In an embodiment, the sum of cells in the images is steady over time when the sum of cells remains within a threshold of an initial sum of cells at a starting time. To this end, the values of the sums are arranged in order based on times of their respective images.

In this regard, it has been identified that during cell migration and other experiments in which cells do not proliferate, new cells are not introduced into the system such that the number of cells should remain steady over time. Thus, if a given sensitivity results in the total number of cells increasing or decreasing over time, the sensitivity is likely resulting in either false positives or false negatives. By utilizing this property of cells during such experiments to determine whether the sensitivity is optimal based on numbers of cells identified via image analysis, the sensitivity selection may be automated. Further, the automated sensitivity selection provides more objective evaluations of sensitivity than manual selection could provide. More specifically, if a human were to determine sensitivity based on manual observation of cells, the process would be subject to human error and would require subjective determinations of whether the total number of cells is remaining steady over time.

Figure 7:
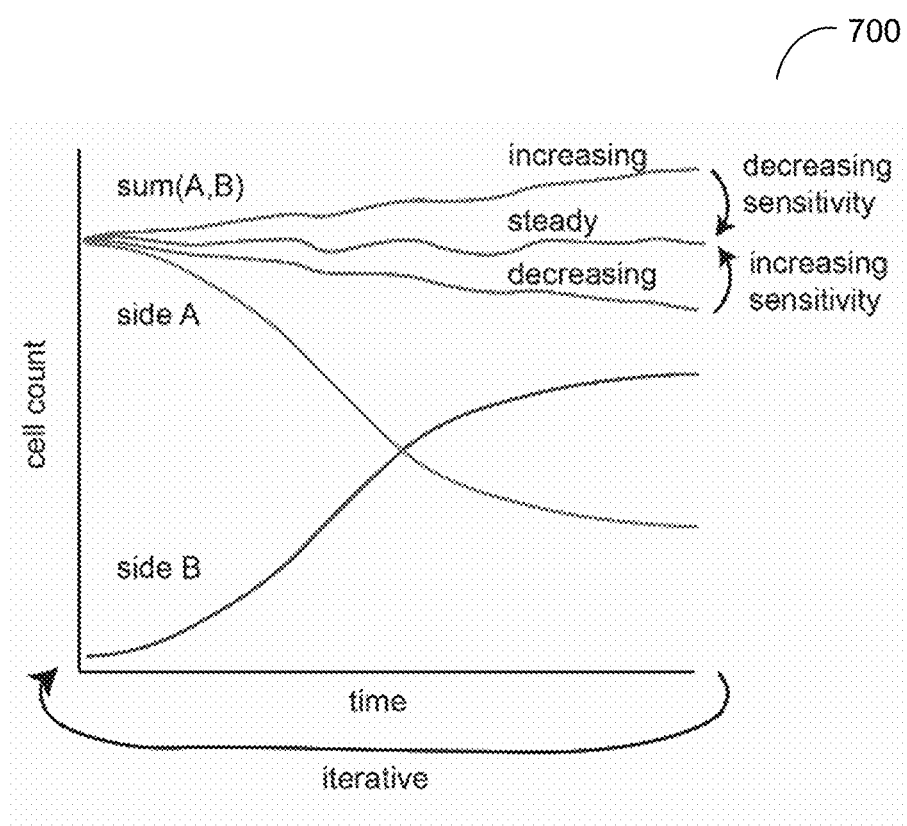
FIG. 7 is a graph utilized to describe selection of cell detection sensitivity according to an embodiment.

FIG. 7 is a graph 700 utilized to describe selection of cell detection sensitivity according to an embodiment. The graph 700 illustrates an example of the expected changes in cell counts on the plate over time during an experiment in which cells do not proliferate. More specifically, during a typical cell migration experiment, it is expected that the number of cells on a first side ("Side A") of a plate will decrease and that the number of cells on a second side ("Side B") will monotonically increase.

For an experiment in which cells do not proliferate, it is expected that the sum of cells on side A and on side B will remain steady over time. If the sum is increasing, the sensitivity is decreased; likewise, if the sum is decreasing, the sensitivity is increased. This modification of sensitivity may be performed iteratively until the sum remains steady over time (e.g., the sum remains within a threshold of an average value for at least a predetermined period of time).

It should be noted that the disclosure illustrates various methods as subprocesses of other methods, but that at least some of the disclosed subprocesses may be performed as discrete processes without requiring the entire process. As a particular non-limiting example, the methods described with respect to FIGS. 3 and 4 may be performed without requiring the results of those methods being utilized to determine cell migration as described with respect to FIG. 2. Further, although FIG. 2 is described with respect to cell migration, other measurements of cell processes (e.g., measurements related to the cell cycle effect) may be equally determined based on images processed as described herein.

Figure 5:
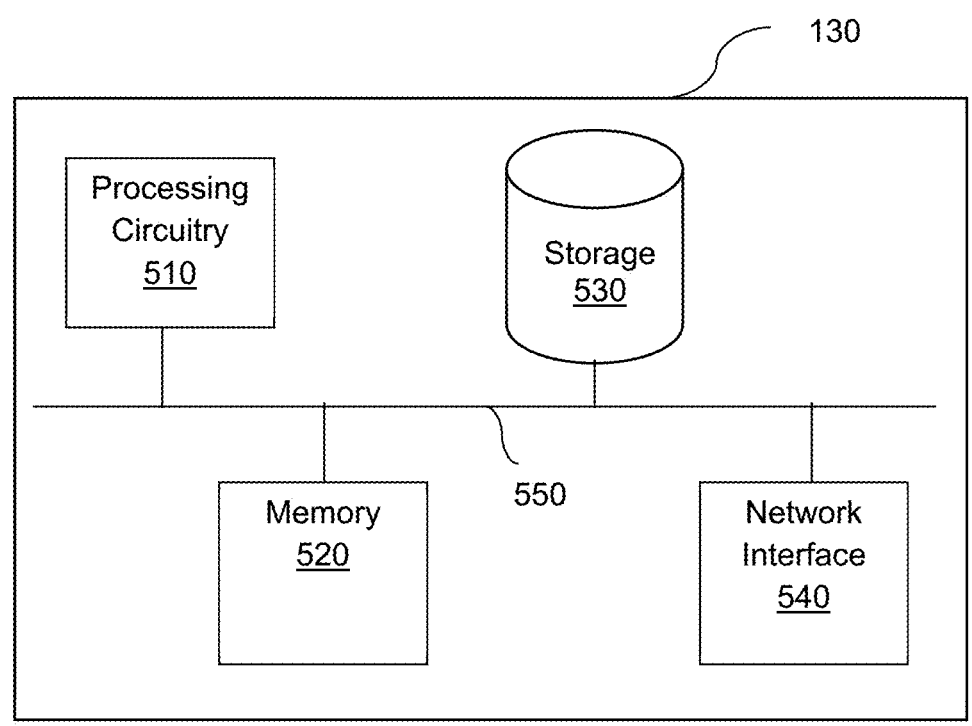
FIG. 5 is a schematic diagram of a cell migration measurement system according to an embodiment.

FIG. 5 is an example schematic diagram of a measurement system 130 according to an embodiment. The measurement system 130 includes a processing circuitry 510 coupled to a memory 520, a storage 530, and a network interface 540. In an embodiment, the components of the measurement system 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the measurement system 130 to communicate with databases 140 for the purpose of, for example, receiving images, and the like. Further, the network interface 540 allows the measurement system 130 to communicate with the user device 120 for the purpose of sending results of image processing, measurement, or both.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for processing microscopic images, comprising:
   generating a smoothed image for a raw image by applying a smoothing filter to the raw image, wherein the raw image shows a plurality of cells and a background;
   generating a high pass filter image by dividing the raw image by the smoothed image, wherein the high pass filter image has a median; and
   transforming the high pass filter image into a transformed image by augmenting a spatial frequency of the plurality of cells shown in the high pass filter image with respect to the background, wherein transforming the high pass filter image into the transformed image further comprises:
   normalizing the high pass filter image by the median to obtain a first result;
   multiplying the first result by a scalar to obtain a second result;
   subtracting the scalar from the second result to obtain a third result; and
   generating the transformed image by taking an absolute value of the third result.

2. The method of claim 1, further comprising:
   selecting a sensitivity by iteratively applying a threshold to the transformed image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and
   generating a processed image based on the transformed image and the selected sensitivity.

3. The method of claim 2, wherein applying the threshold at each iteration further comprises:
   determining a current threshold value for the threshold based on the current sensitivity and a focus value, wherein the threshold is applied using the current threshold value, wherein the focus value represents a degree of focus and is determined based on the raw image.

4. The method of claim 1, wherein the plurality of cells is disposed on a plate having a first side and a second side, further comprising:
   filtering at least one false positive object from the transformed image, wherein filtering the at least one false positive object further comprises calculating a jitter for each of the first side and the second side, wherein each false positive object is an object on the first side when the jitter calculated for the first side is less than the jitter calculated for the second side.

5. The method of claim 2, wherein the processed image is a first processed image of a plurality of processed images, wherein each of the plurality of processed images shows a plate on which a plurality of cells is disposed, further comprising:
   detecting the plurality of cells in each of the plurality of processed images; and determining a degree of cell migration at each of a plurality of times based on the detected plurality of cells in each of the plurality of processed images, wherein each of the plurality of times corresponds to a respective processed image of the plurality of processed images.

6. The method of claim 5, wherein the plate has a first side and a second side, wherein determining the degree of cell migration at each of the plurality of times further comprises:
comparing a number of cells on the first side to a number of cells on the second side based on the corresponding processed image; and
determining a value representing the degree of cell migration at the time based on the comparison.

7. The method of claim 5, further comprising:
determining at least one morphological measure for each of the plurality of processed images based on the detected plurality of cells for the first processed image, wherein the at least one morphological measure includes at least one of: circularity, ratio between minor and major axes, area to convex area ratio, and area.

8. A non-transitory computer readable medium having stored thereon instructions for causing a processing circuitry to execute a process, the process comprising:
generating a smoothed image for a raw image by applying a smoothing filter to the raw image, wherein the raw image shows a plurality of cells and a background;
generating a high pass filter image by dividing the raw image by the smoothed image, wherein the high pass filter image has a median; and
transforming the high pass filter image into a transformed image by augmenting a spatial frequency of the plurality of cells shown in the high pass filter image with respect to the background, wherein transforming the high pass filter image into the transformed image further comprises:
normalizing the high pass filter image by the median to obtain a first result;
multiplying the first result by a scalar to obtain a second result;
subtracting the scalar from the second result to obtain a third result; and
generating the transformed image by taking an absolute value of the third result.

9. A system for processing images, comprising:
a processing circuitry; and
a memory, the memory containing instructions that, when executed by the processing circuitry, configure the system to:
generate a smoothed image for a raw image by applying a smoothing filter to the raw image, wherein the raw image shows a plurality of cells and a background;
generate a high pass filter image by dividing the raw image by the smoothed image, wherein the high pass filter image has a median; and
transform the high pass filter image into a transformed image by augmenting a spatial frequency of the plurality of cells shown in the high pass filter image with respect to the background, wherein the system is further configured to:
normalize the high pass filter image by the median to obtain a first result;
multiply the first result by a scalar to obtain a second result;
subtract the scalar from the second result to obtain a third result; and
generate the transformed image by taking an absolute value of the third result.

10. The system of claim 9, wherein the system is further configured to:
select a sensitivity by iteratively applying a threshold to the transformed image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and
generate a processed image based on the transformed image and the selected sensitivity.

11. The system of claim 10, wherein the system is further configured to:
determine a current threshold value for the threshold based on the current sensitivity and a focus value, wherein the threshold is applied using the current threshold value, wherein the focus value represents a degree of focus and is determined based on the raw image.

12. The system of claim 9, wherein the plurality of cells is disposed on a plate having a first side and a second side, wherein the system is further configured to:
filter at least one false positive object from the transformed image, wherein filtering the at least one false positive object further comprises calculating a jitter for each of the first side and the second side, wherein each false positive object is an object on the first side when the jitter calculated for the first side is less than the jitter calculated for the second side.

13. The system of claim 10, wherein the processed image is a first processed image of a plurality of processed images, wherein each of the plurality of processed images shows a plate on which a plurality of cells is disposed, wherein the system is further configured to:
detect the plurality of cells in each of the plurality of processed images; and
determine a degree of cell migration at each of a plurality of times based on the detected plurality of cells in each of the plurality of processed images, wherein each of the plurality of times corresponds to a respective processed image of the plurality of processed images.

14. The system of claim 13, wherein the plate has a first side and a second side, wherein the system is further configured to:
compare a number of cells on the first side to a number of cells on the second side based on the corresponding processed image; and
determine a value representing the degree of cell migration at the time based on the comparison.

15. The system of claim 13, wherein the system is further configured to:
determine at least one morphological measure for each of the plurality of processed images based on the detected plurality of cells for the first processed image, wherein the at least one morphological measure includes at least one of: circularity, ratio between minor and major axes, area to convex area ratio, and area.

16. A method for processing microscopic images, comprising:
selecting a sensitivity by iteratively applying a threshold to a first image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and generating a second image using the selected sensitivity, wherein the second image is a processed image.

17. The method of claim 16, wherein the image is a transformed image, wherein applying the threshold to the image at each iteration further comprises:

determining a current threshold value for the threshold based on the current sensitivity and a focus value, wherein the threshold is applied using the current threshold value, wherein the focus value represents a degree of focus of a raw image, wherein the transformed image is generated based on the raw image.

18. The method of claim 17, further comprising:

generating a smoothed image for the raw image by applying a smoothing filter to the raw image, wherein the raw image shows a plurality of cells and a background;

generating a high pass filter image by dividing the raw image by the smoothed image; and transforming the high pass filter image into the transformed image by augmenting a spatial frequency of the plurality of cells shown in the high pass filter image with respect to the background.

19. A method for processing microscopic images, comprising:

generating a smoothed image for a raw image by applying a smoothing filter to the raw image, wherein the raw image shows a plurality of cells and a background;

generating a high pass filter image by dividing the raw image by the smoothed image;

transforming the high pass filter image into a transformed image by augmenting a spatial frequency of the plurality of cells shown in the high pass filter image with respect to the background;

selecting a sensitivity by iteratively applying a threshold to the transformed image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and generating a processed image based on the transformed image and the selected sensitivity.

20. A method for processing microscopic images, comprising:

generating a smoothed image for a raw image by applying a smoothing filter to the raw image, wherein the raw image shows a plurality of cells and a background;

generating a high pass filter image by dividing the raw image by the smoothed image; and transforming the high pass filter image into a transformed image by augmenting a spatial frequency of the plurality of cells shown in the high pass filter image with respect to the background, wherein the plurality of cells is disposed on a plate having a first side and a second side, further comprising:

filtering at least one false positive object from the transformed image, wherein filtering the at least one false positive object further comprises calculating a jitter for each of the first side and the second side, wherein each false positive object is an object on the first side when the jitter calculated for the first side is less than the jitter calculated for the second side.

21. A system for processing images, comprising:

a processing circuitry; and a memory, the memory containing instructions that, when executed by the processing circuitry, configure the system to:

generate a smoothed image for a raw image by applying a smoothing filter to the raw image, wherein the raw image shows a plurality of cells and a background;

generate a high pass filter image by dividing the raw image by the smoothed image;

transform the high pass filter image into a transformed image by augmenting a spatial frequency of the plurality of cells shown in the high pass filter image with respect to the background;

select a sensitivity by iteratively applying a threshold to the transformed image until a sum of cells shown in the image is steady, wherein the threshold is applied at each iteration using a current sensitivity, wherein the sum of cells in the image is determined to be steady when the sum of cells remains within a threshold of an initial sum of cells after a predetermined period of time, wherein the selected sensitivity is the current sensitivity being used when the sum of cells shown in the image is determined to be steady; and generate a processed image based on the transformed image and the selected sensitivity.

22. A system for processing images, comprising:

a processing circuitry; and a memory, the memory containing instructions that, when executed by the processing circuitry, configure the system to:

generate a smoothed image for a raw image by applying a smoothing filter to the raw image, wherein the raw image shows a plurality of cells and a background;

generate a high pass filter image by dividing the raw image by the smoothed image; and transform the high pass filter image into a transformed image by augmenting a spatial frequency of the plurality of cells shown in the high pass filter image with respect to the background, wherein the plurality of cells is disposed on a plate having a first side and a second side, wherein the system is further configured to:

filter at least one false positive object from the transformed image, wherein filtering the at least one false positive object further comprises calculating a jitter for each of the first side and the second side, wherein each false positive object is an object on the first side when the jitter calculated for the first side is less than the jitter calculated for the second side.

* * * * *